US008403300B2

(12) United States Patent
Ziemba

(10) Patent No.: US 8,403,300 B2
(45) Date of Patent: Mar. 26, 2013

(54) DEVICE AND METHOD FOR LIFTING SHEET PILES

(76) Inventor: Richard Ziemba, Milford, PA (US)

( * ) Notice: Subject to any disclaimer, the term of this patent is extended or adjusted under 35 U.S.C. 154(b) by 380 days.

(21) Appl. No.: 12/805,248

(22) Filed: Jul. 21, 2010

(65) Prior Publication Data

US 2011/0033278 A1 Feb. 10, 2011

Related U.S. Application Data

(60) Provisional application No. 61/272,013, filed on Aug. 7, 2009.

(51) Int. Cl.
*B66F 3/00* (2006.01)
*B62B 3/04* (2006.01)

(52) U.S. Cl. .................................... 254/133 R; 254/3 R

(58) Field of Classification Search ............... 294/82.24, 294/1.1, 215, 82.22, 82.33, 101; 405/274, 405/232; 254/3 R, 133 R; 414/800, 11, 222.01; *B66F 3/00; E02D 7/00, 9/00*
See application file for complete search history.

(56) References Cited

U.S. PATENT DOCUMENTS

| | | | | | |
|---|---|---|---|---|---|
| 3,100,382 | A | * | 8/1963 | Muller | 405/232 |
| 4,022,433 | A | * | 5/1977 | Kondo | 173/88 |
| 4,427,228 | A | * | 1/1984 | Mattila | 294/82.24 |
| 5,255,950 | A | * | 10/1993 | Davies | 294/103.1 |
| 5,433,493 | A | * | 7/1995 | Dix et al. | 294/104 |
| 5,498,107 | A | * | 3/1996 | Schatzle, Jr. | 405/224 |
| 5,503,503 | A | * | 4/1996 | Glass et al. | 405/274 |
| 5,803,672 | A | * | 9/1998 | Glass et al. | 405/274 |
| 6,224,320 | B1 | * | 5/2001 | Klenk | 414/790.8 |
| 6,231,271 | B1 | * | 5/2001 | Glass et al. | 405/274 |
| 7,134,562 | B2 | * | 11/2006 | Burkett | 212/180 |
| 7,198,115 | B2 | * | 4/2007 | Cardoso | 173/13 |
| 2007/0065235 | A1 | * | 3/2007 | Glass et al. | 405/276 |
| 2011/0008111 | A1 | * | 1/2011 | Jinnings et al. | 405/232 |
| 2012/0107056 | A1 | * | 5/2012 | Hecht et al. | 405/231 |
| 2012/0114424 | A1 | * | 5/2012 | White | 405/232 |

* cited by examiner

*Primary Examiner* — Joseph J Hail
*Assistant Examiner* — Marc Carlson
(74) *Attorney, Agent, or Firm* — Thomas J. Germinario

(57) ABSTRACT

A device enables a sheet pile to be lifted from a horizontal position on the ground to a vertical position in the air, where it can be attached to a vibratory hammer. The device comprises two members, one of which attaches to the sheet pile and the other to the vibratory hammer. The two members are rotatably connected by a spindle, and they can be alternately locked into an extended (straight vertical) or bent (perpendicular) orientation by a lever-actuated spring-loaded key in the lower member that engages one or more slots in the upper member.

2 Claims, 14 Drawing Sheets

DEVICE AND METHOD FOR LIFTING SHEET PILES

REFERENCE TO RELATED APPLICATION

This application claims the benefit of the filing date of Provisional Application No. 61/272,013 filed Aug. 7, 2009.

BACKGROUND OF THE INVENTION

The present invention relates to equipment for handling and driving sheet piles.

Because of their weight and bulk, sheet piles are dangerous to handle. In current practice, sheet piles are lifted from a horizontal position on the ground to a vertical position in the air by hoisting means with the manual assistance of workers who must stand under the sheet pile and guide it into a vertical alignment in which it can be attached to a driving means, such as a vibratory hammer. This process is both hazardous and very time-consuming.

The present invention provides a device which allows sheet piles to be lifted from a horizontal position on the ground to a vertical alignment for connection to the hammer without manual guidance from underneath the sheet pile. It therefore makes the process more safe and efficient.

SUMMARY OF THE INVENTION

The present invention is a device that enables a sheet pile to be lifted from a horizontal position on the ground to a vertical position in the air, where it can be attached to a vibratory hammer. The invention comprises two members, one of which attaches to the sheet pile and the other to the vibratory hammer. The two members are rotatably connected by a spindle, and they can be alternately locked into an extended (straight vertical) or bent (perpendicular) orientation by a lever-actuated spring-loaded key in the lower member that engages one or more slots in the upper member.

In the bent orientation, the vertical upper member can be attached to a lifting means, while the horizontal lower member can be attached (through a mandrel or pneumatic vise) to the horizontal sheet pile lying on the ground. As the device is lifted with the sheet pile attached, the key is disengaged from the slot and allows the lower member to rotate into the extended position as it is pulled downward by the weight of the sheet pile. Once the device is in the extended position, the key engages the slot and the device is locked in a rigid vertical position. The top of the device can now be connected to a pile-driving device, such as a vibratory hammer.

DETAILED DESCRIPTION OF THE PREFERRED EMBODIMENTS

Figure 1:
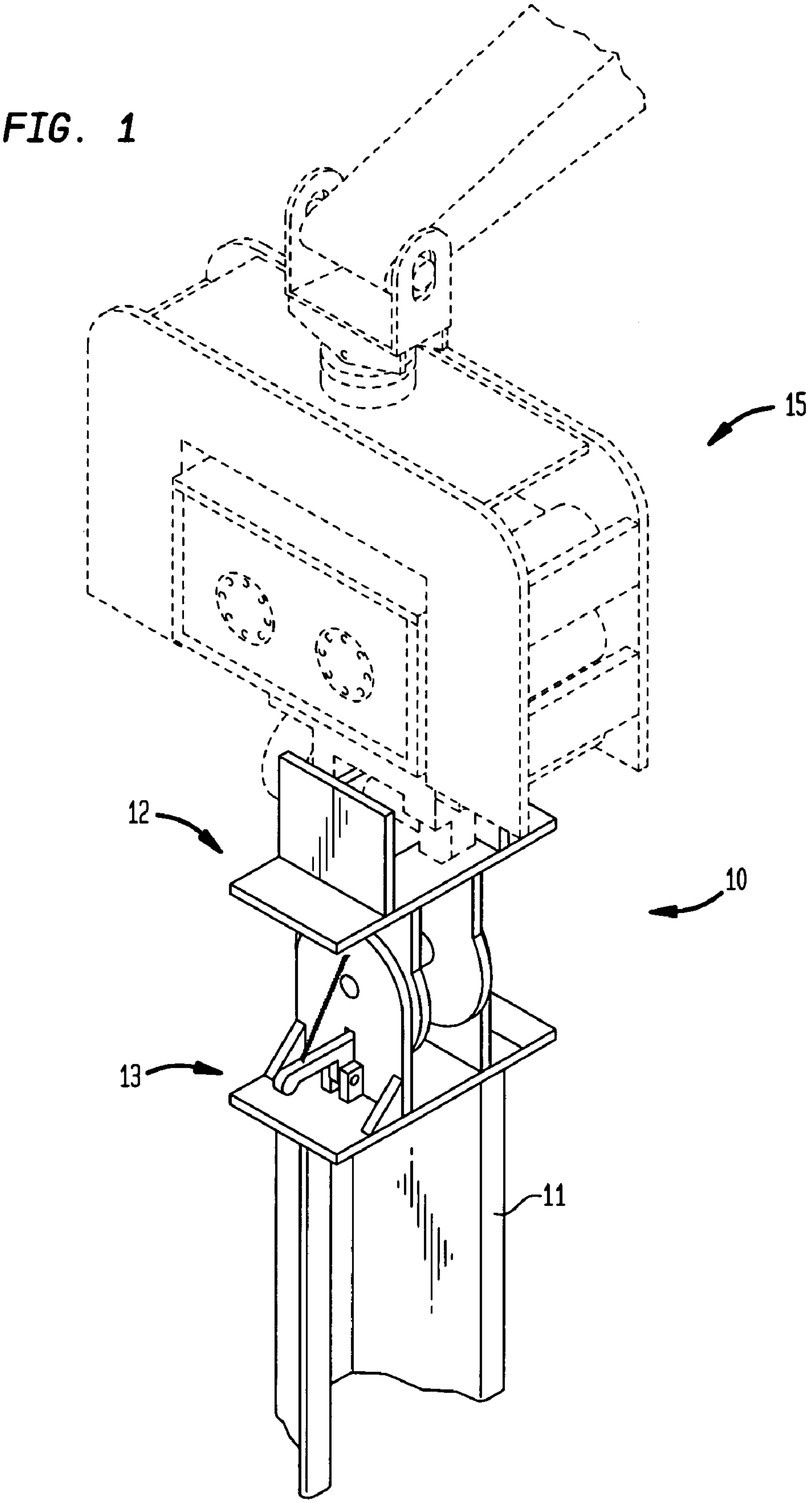
FIG. 1 is a perspective view of the first preferred embodiment of the present invention in the locked extended position clamped to a vibratory hammer above.
Figure 2:
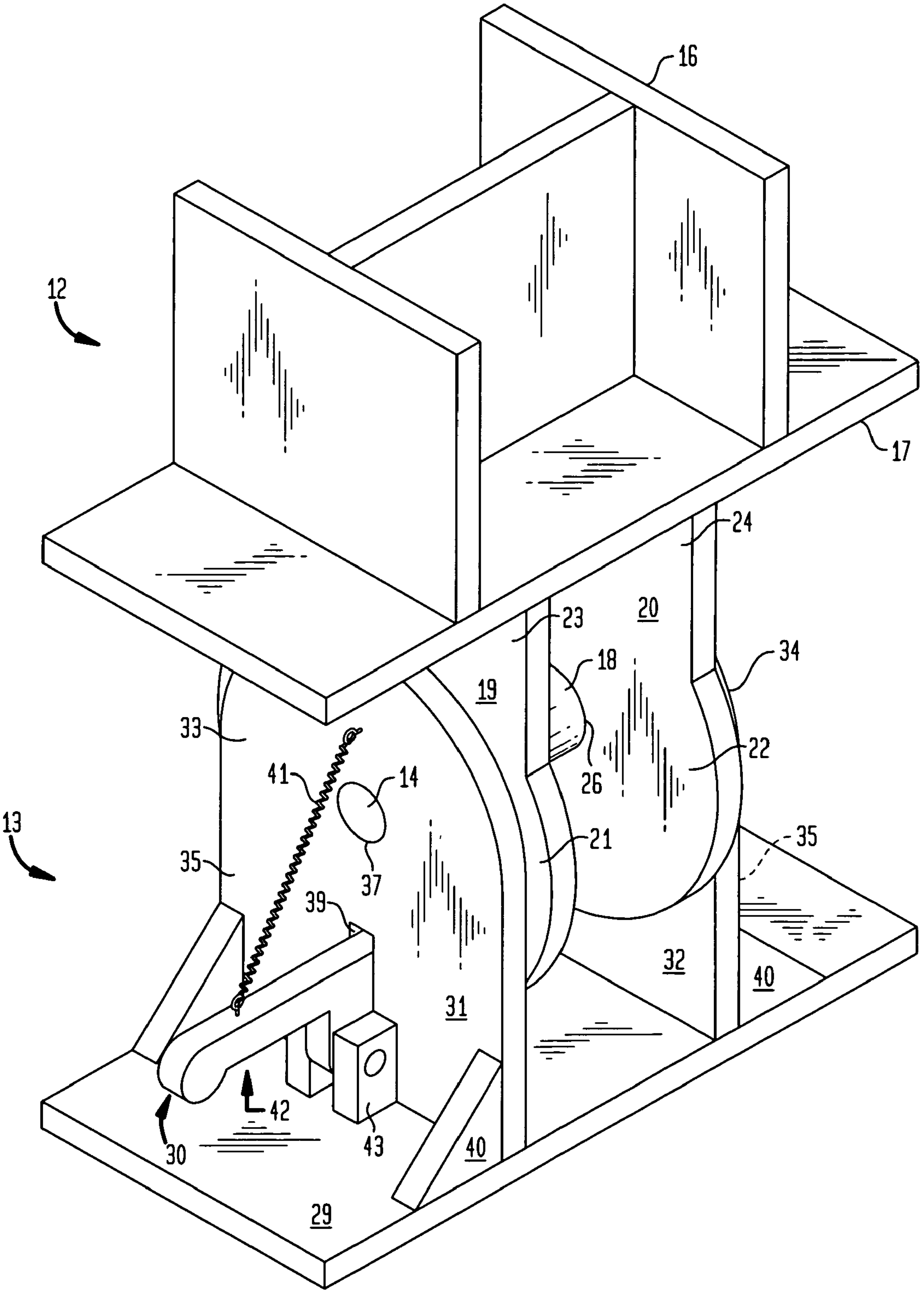
FIG. 2 is a perspective view of the first preferred embodiment of the present invention in the locked extended position, excluding the mandrel.

As depicted in FIGS. 1-7, the first preferred embodiment of the present invention 10 is designed to handle plastic sheet piles which are supported by a mandrel 11. Referring to FIGS. 1 and 2, this embodiment comprises an upper member 12 that is rotatably attached to a lower member 13 by means of a spindle 14. In operation, the upper member 12 is typically clamped to a vibratory hammer 15 that drives the sheet pile into the ground. FIGS. 1 and 2 depict the device 10 in an extended position, in which the upper and lower members 11 and 12 are linearly aligned. In the extended position, the device 10 is able to transmit the force of the vibratory hammer 15 through the mandrel 11 to the sheet pile.

As depicted in FIG. 2, the upper member 12 comprises an attachment beam 16, a top plate 17, a spindle sleeve 18, and two upper cams—a left upper cam 19 and a right upper cam 20. The attachment beam 16 is preferably an I-beam welded from 1" steel plate. The attachment beam 16 is welded to the top plate 17, which is a rectangular plate also preferably made of 1" steel plate. The two upper cams 19 and 20 are welded to the bottom of the top plate 17 and are also preferably fabricated of 1" plate steel. Each of the upper cams 19 and 20 integrally consists of a rotary panel 21 and 22 and a support panel 23 and 24. Consequently, there is a left rotary panel 21, a right rotary panel 22, a left support panel 23, and a right support panel 24. The left rotary panel 21 and the right rotary panel 22 are connected by the spindle sleeve 18, which is tubular steel preferably having an inner diameter of 6". The ends of the spindle sleeve 18 are aligned with a left sleeve aperture 25 and a right sleeve aperture 26, each of which preferably has a diameter of 6".

Figure 5:
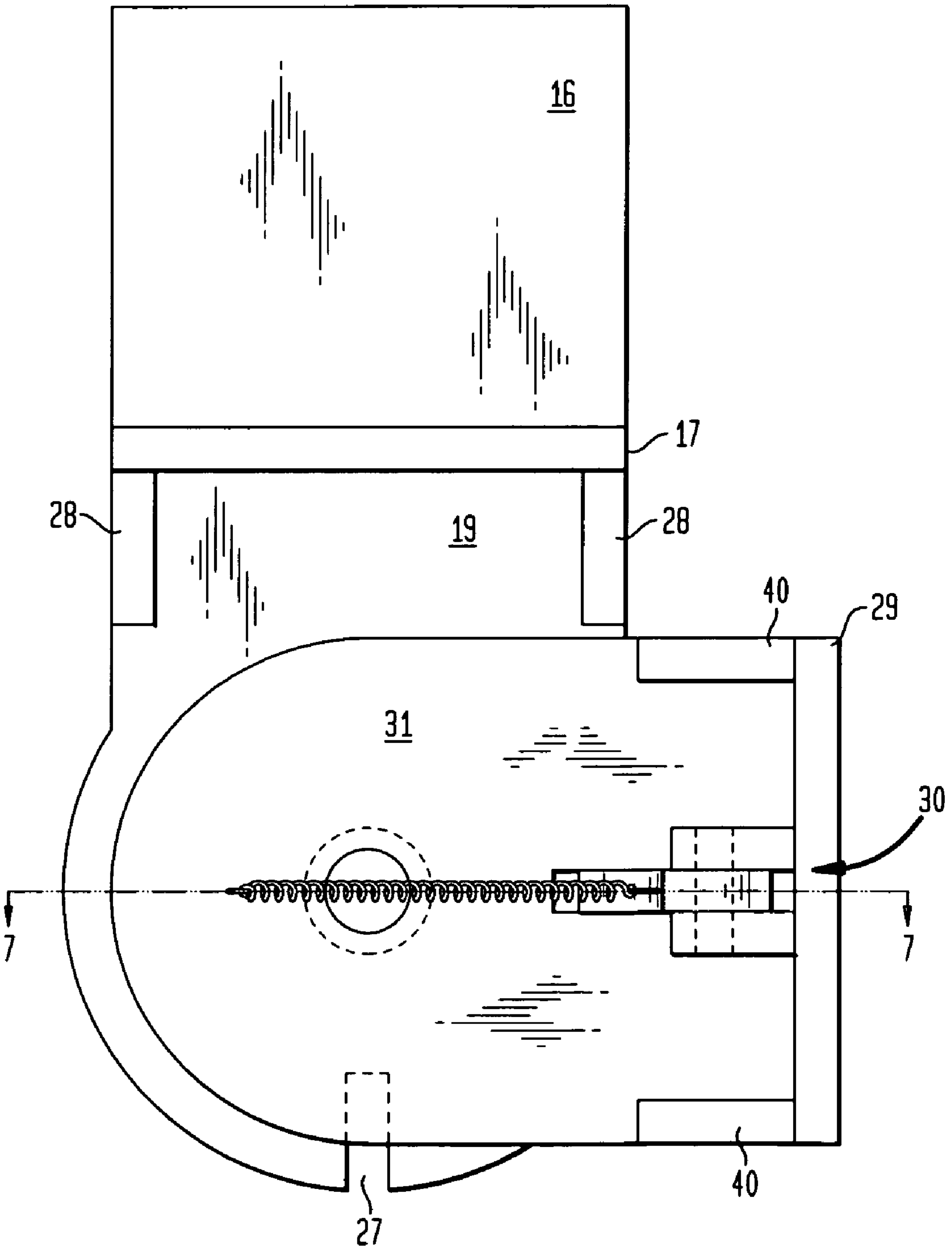
FIG. 5 is a left profile view of the first preferred embodiment of the present invention in the unlocked bent position, excluding the mandrel.
Figure 6:
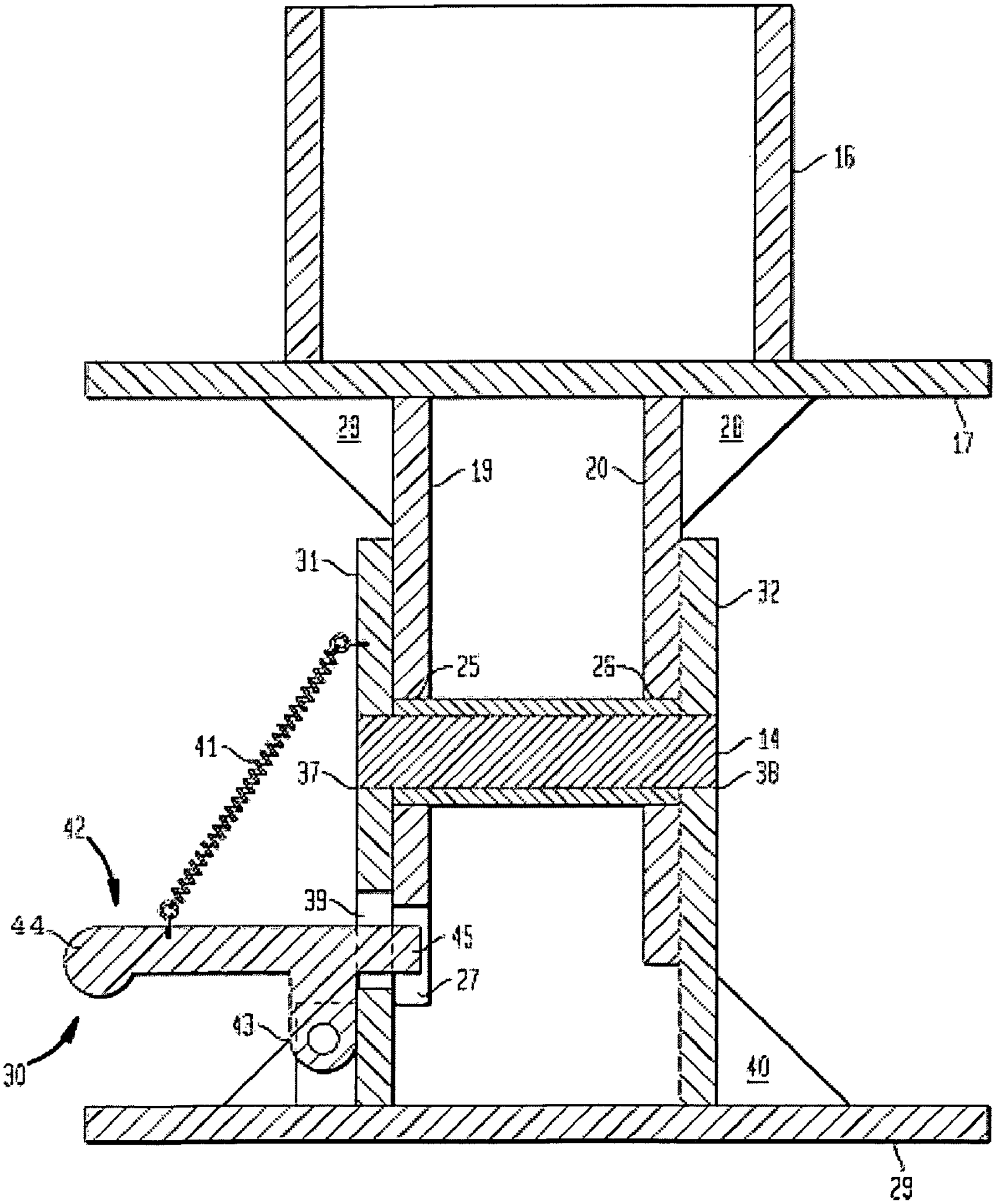
FIG. 6 is a cross-section view, along line 6 of FIG. 4, of the first preferred embodiment of the present invention in the locked extended position, excluding the mandrel.

As shown in FIGS. 5 and 6, one or both of the two rotary panels 21 and 22 has a key slot 27, which is vertically aligned downward when the device 10 is in the extended position. The key slot 27 is used for locking the device 10 in the extended position, as will be subsequently explained.

Figure 4:
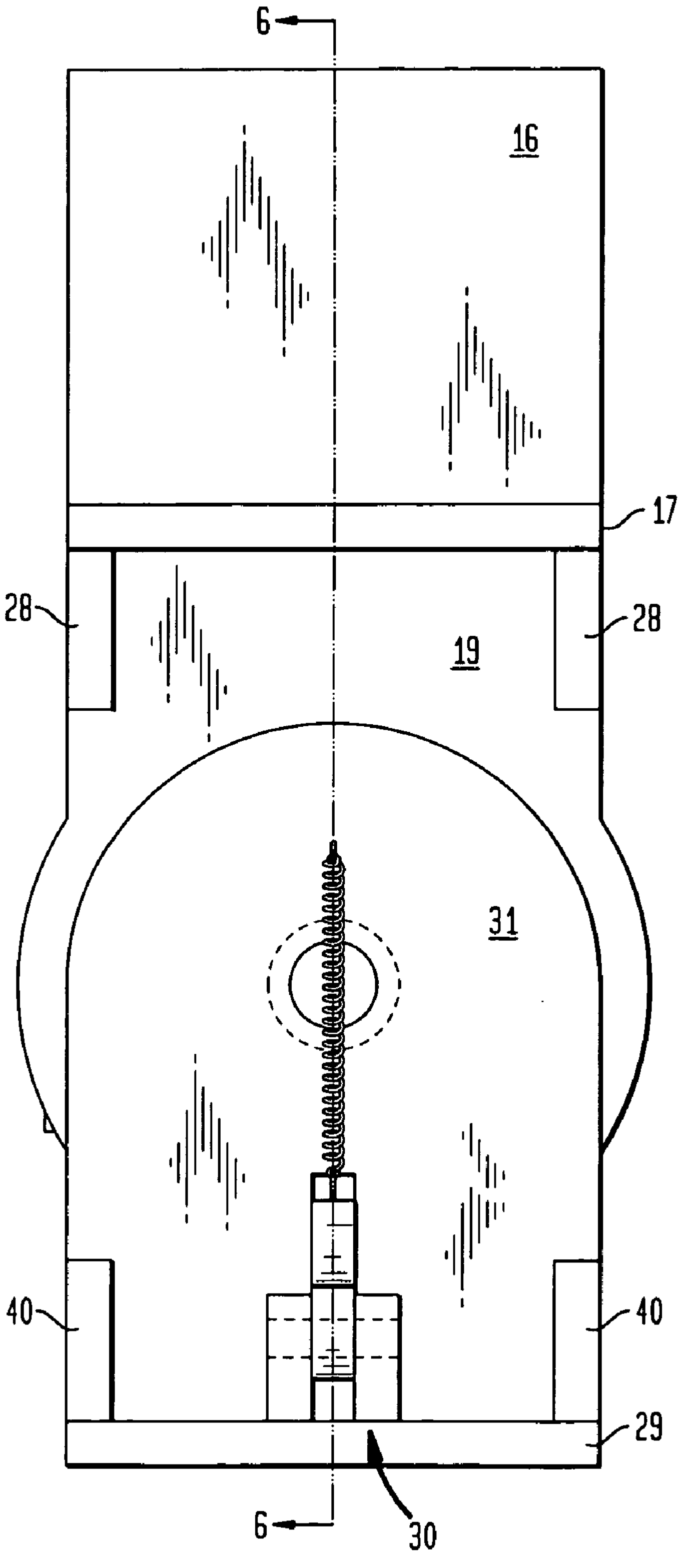
FIG. 4 is a left profile view of the first preferred embodiment of the present invention in the locked extended position, excluding the mandrel.

Optionally, as shown in FIGS. 4-6, the support of the top plate 17 can be reinforced by one or more upper angle braces 28 welded between each of the support panels 23 and 24 and the bottom of the top plate 17. The upper angle braces are preferably made of 1" plate steel.

Figure 3:
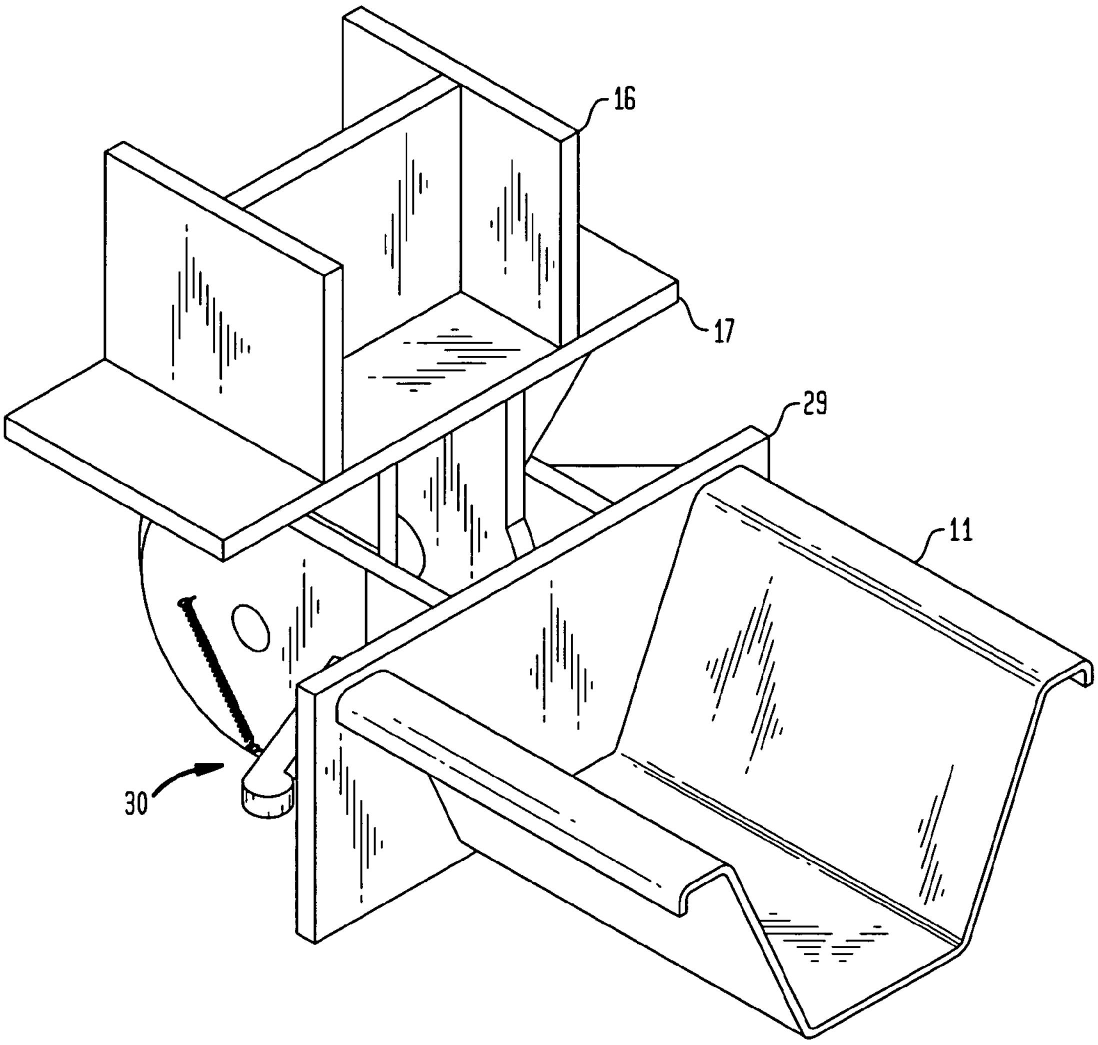
FIG. 3 is a perspective view of the first preferred embodiment of the present invention in the unlocked bent position.

As depicted in FIG. 2, the lower member 13 comprises a base plate 29, a locking mechanism 30, and two lower cams—a left lower cam 31 and a right lower cam 32. Not shown in FIG. 2, but also comprising part of the lower member 13, is the mandrel 11, which is depicted in FIGS. 1 and 3. The mandrel 11 conforms to the shape and dimensions of the sheet pile and is preferably made of 1" plate steel. The mandrel 11 is welded to the bottom of the base plate 29, which is a rectangular plate also preferably made of 1" steel plate. The base plate 29 is aligned parallel to the top plate 17. The two lower cams 31 and 32 are welded to the top of the base plate 29 and are also preferably fabricated of 1" plate steel. Each of the lower cams 31 and 32 integrally consists of a swivel panel 33 and 34 and a bracket panel 35 and 36. Consequently, there is a left swivel panel 33, a right swivel panel 34, a left bracket panel 35, and a right bracket panel 36. The left swivel panel 33 and the right swivel panel 34 are rotatably connected to the spindle sleeve 18 and to the rotary panels 21 and 22 of the two upper cams 19 and 20 by the spindle 14, which is a solid steel rod, preferably having an outer diameter of 6". The ends of the spindle 14 pass through a left spindle aperture 37 and a right spindle aperture 38, each of which preferably has an inside diameter of 6".

As shown in FIG. 2, one or both of the two bracket panels 35 and 36 has a lock opening 39, through which the locking mechanism 30 communicates with the key slot 27 in locking the device 10 in the extended position, as will be subsequently explained.

Optionally, as shown in FIG. 2, the support of the base plate 29 can be reinforced by one or more lower angle braces 40 welded between each of the bracket panels 35 and 36 and the top of the base plate 29. The lower angle braces are preferably made of 1" plate steel.

As depicted in FIGS. 2 and 6, the locking mechanism 30 comprises a spring 41, a lever arm 42, and a pivot 43. The lever arm comprises a handle 44 and a key 45, with the pivot 43 being located between them. One end of the spring 41 is attached to the handle 44, while the other end is anchored on the adjoining swivel panel 33. When the key slot 27 is aligned with the lock opening 39, the contraction of the spring 41 pulls the handle 44 upward, causing the lever arm 42 to pivot so that the key 45 moves downward to engage the key slot 27. When the device is in the extended position, as depicted in FIGS. 2 and 6, the key slot 27 aligns with the lock opening 39, and the key 45 extends through the lock opening 39 into the key slot 27, where it is locked in place by the force of the spring 41.

Figure 7:
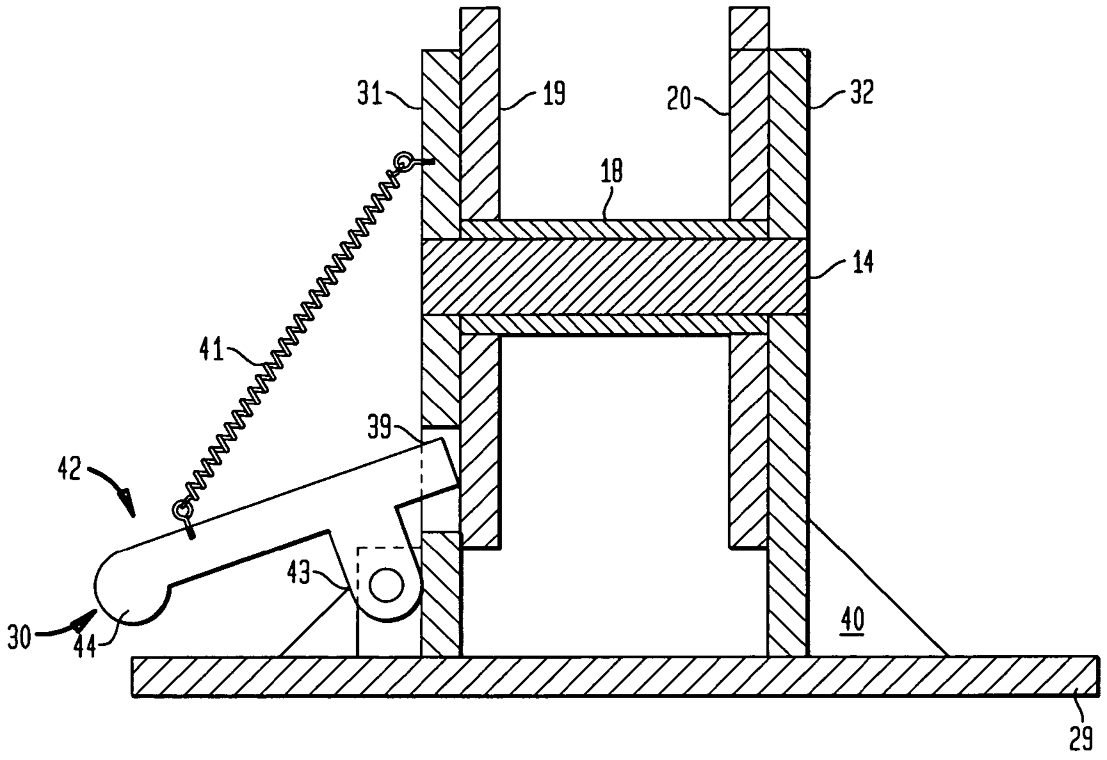
FIG. 7 is a cross-section view, along line 7 of FIG. 5, of the first preferred embodiment of the present invention in the unlocked bent position, excluding the mandrel.

As illustrated in FIGS. 3 and 7, when a sheet pile is to be loaded into the mandrel 11, the handle 44 is depressed, which expands the spring 41 and causes the lever arm 42 to pivot so that the key 45 moves upward and disengages from the key slot 27. The lower member 13 is now free to rotate to a perpendicular orientation with respect to the upper member 12, and the device 10 is now in the bent position. Once the sheet pile is loaded and attached to the mandrel 11, the device 10 is hoisted upward by the attachment beam 16. As the device 10 is hoisted, the weight of the mandrel and sheet pile pull the lower member 13 down into a vertical orientation with respect to the upper member 12, thus causing the lower member 13 to rotate back into the extended position in which the lock opening 39 aligns with the key slot 27. The key 45 is now free to move downward into the key slot 27 and is urged to do so by the contracting force of the spring 41. With the key 45 engaged in the key slot 27, the device 10 is locked in the extended position and is ready to be driven by the vibratory hammer 15.

Figure 8:
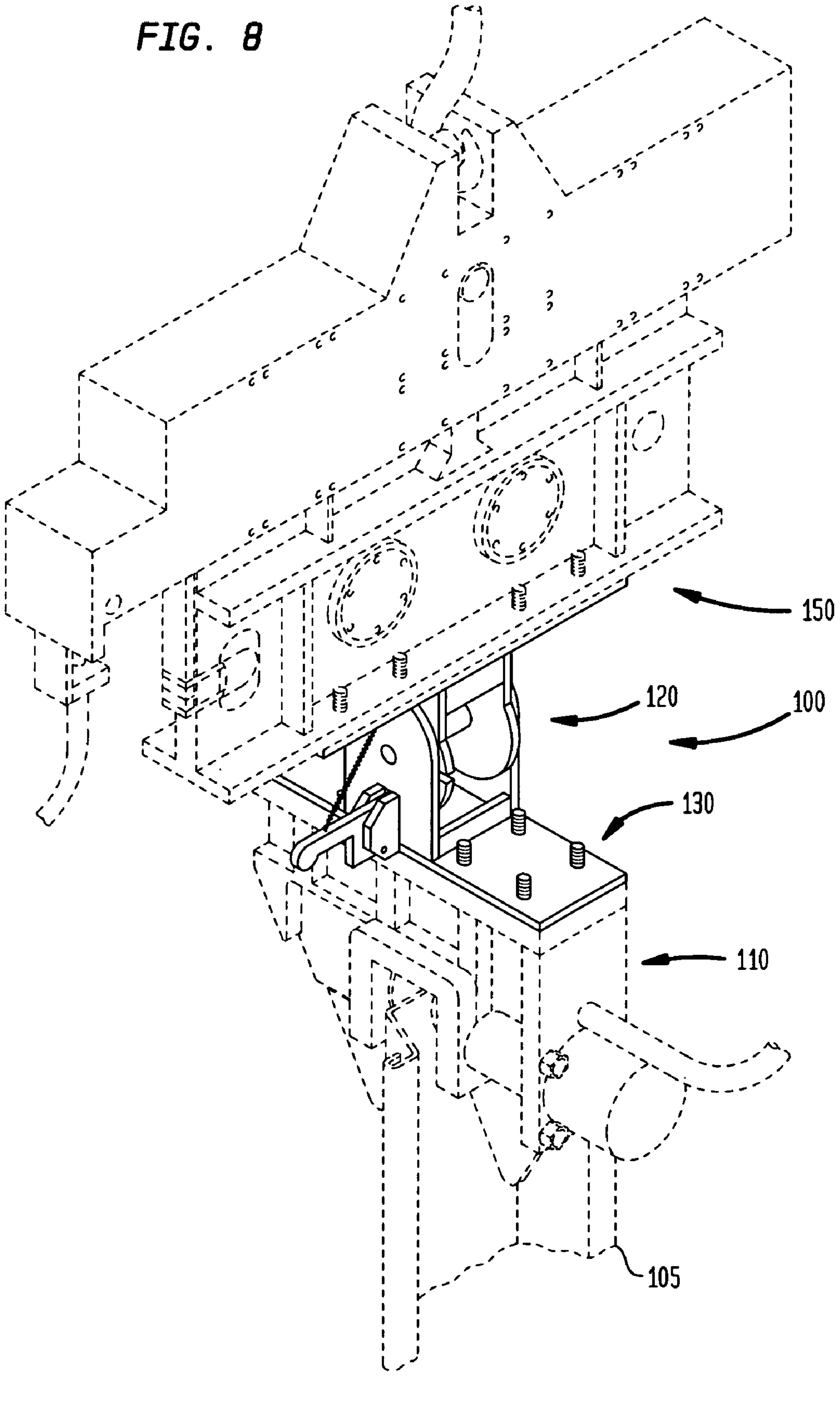
FIG. 8 is a perspective view of the second preferred embodiment of the present invention in the locked extended position bolted to a vibratory hammer above and a pile-gripping mechanism below.
Figure 9:
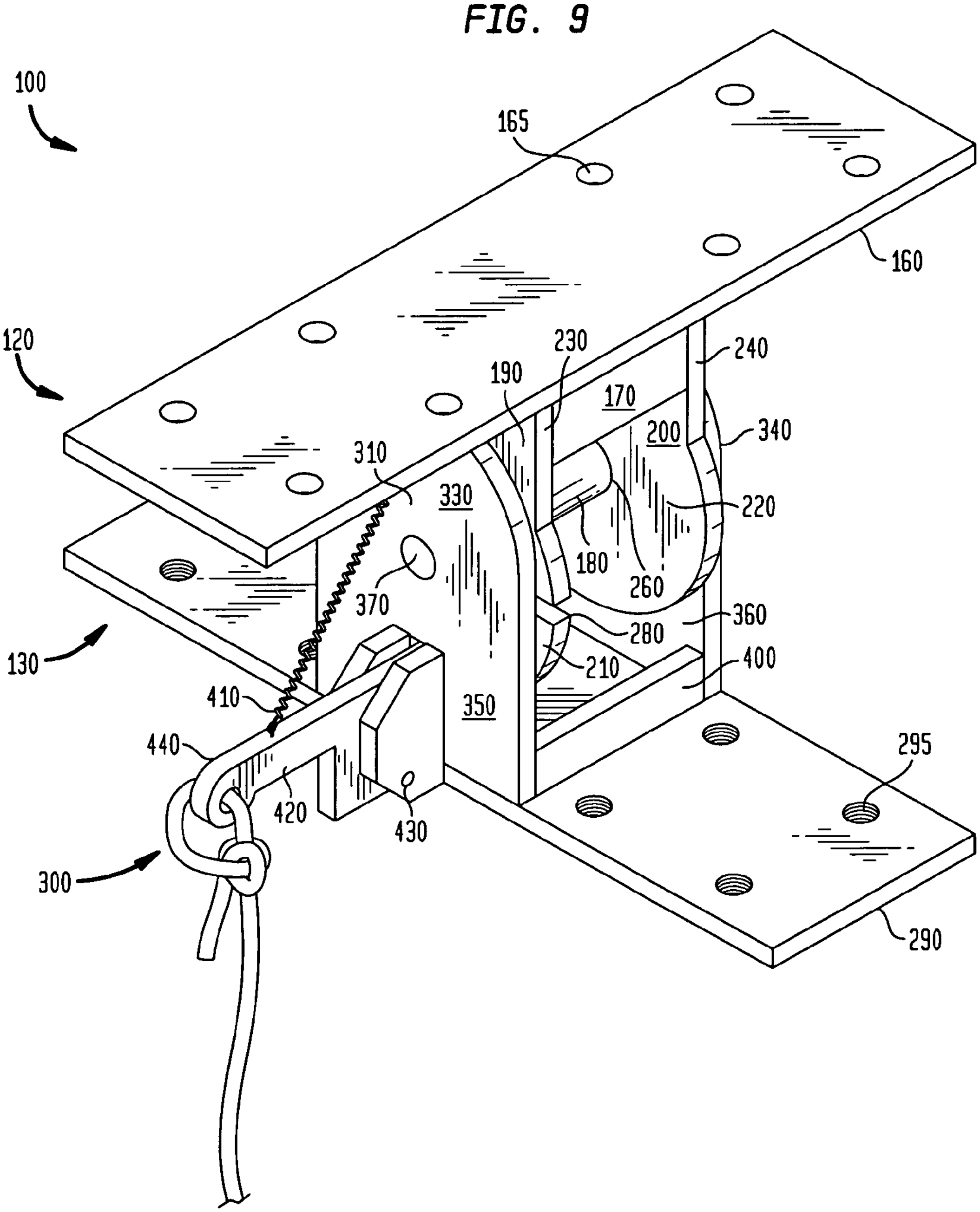
FIG. 9 is a perspective view of the second preferred embodiment of the present invention in the locked extended position.

As depicted in FIGS. 8-14, the second preferred embodiment of the present invention 100 is designed to handle steel sheet piles 105 which are not supported by a mandrel. Instead, the top of the steel sheet pile 105 is secured between the jaws of a pneumatic vise 110. Referring to FIGS. 8 and 9, this embodiment comprises an upper member 120 that is rotatably attached to a lower member 130 by means of a spindle 140. In operation, the upper member 120 is bolted to a vibratory hammer 150 that drives the sheet pile 105 into the ground. FIGS. 8 and 9 depict the device 100 in an extended position, in which the upper and lower members 110 and 120 are linearly aligned. In the extended position, the device 100 is able to transmit the force of the vibratory hammer 150 through the vise 110 to the sheet pile.

As depicted in FIG. 9, the upper member 120 comprises an attachment plate 160, two upper lateral supports 170, a spindle sleeve 180, and two upper cams—a left upper cam 190 and a right upper cam 200. Preferably, all of the components of the upper member 120 form a single integral unit of precast steel, but they may also be welded together. The attachment plate 160 has multiple upper bolt holes 165, by which it is bolted to the vibratory hammer 150. The attachment plate 160 is preferably made of precast steel. The two upper cams 190 and 200 extend from the bottom of the attachment plate 160 and are also preferably fabricated of precast steel. Each of the upper cams 190 and 200 integrally consists of a rotary panel 210 and 220 and a support panel 230 and 240. Consequently, there is a left rotary panel 210, a right rotary panel 220, a left support panel 230, and a right support panel 240. The left rotary panel 210 and the right rotary panel 220 are connected by the spindle sleeve 180, which is tubular steel preferably having an inner diameter of 6". The ends of the spindle sleeve 180 are aligned with a left sleeve aperture 250 and a right sleeve aperture 260, each of which preferably has a diameter of 6".

Figure 10:
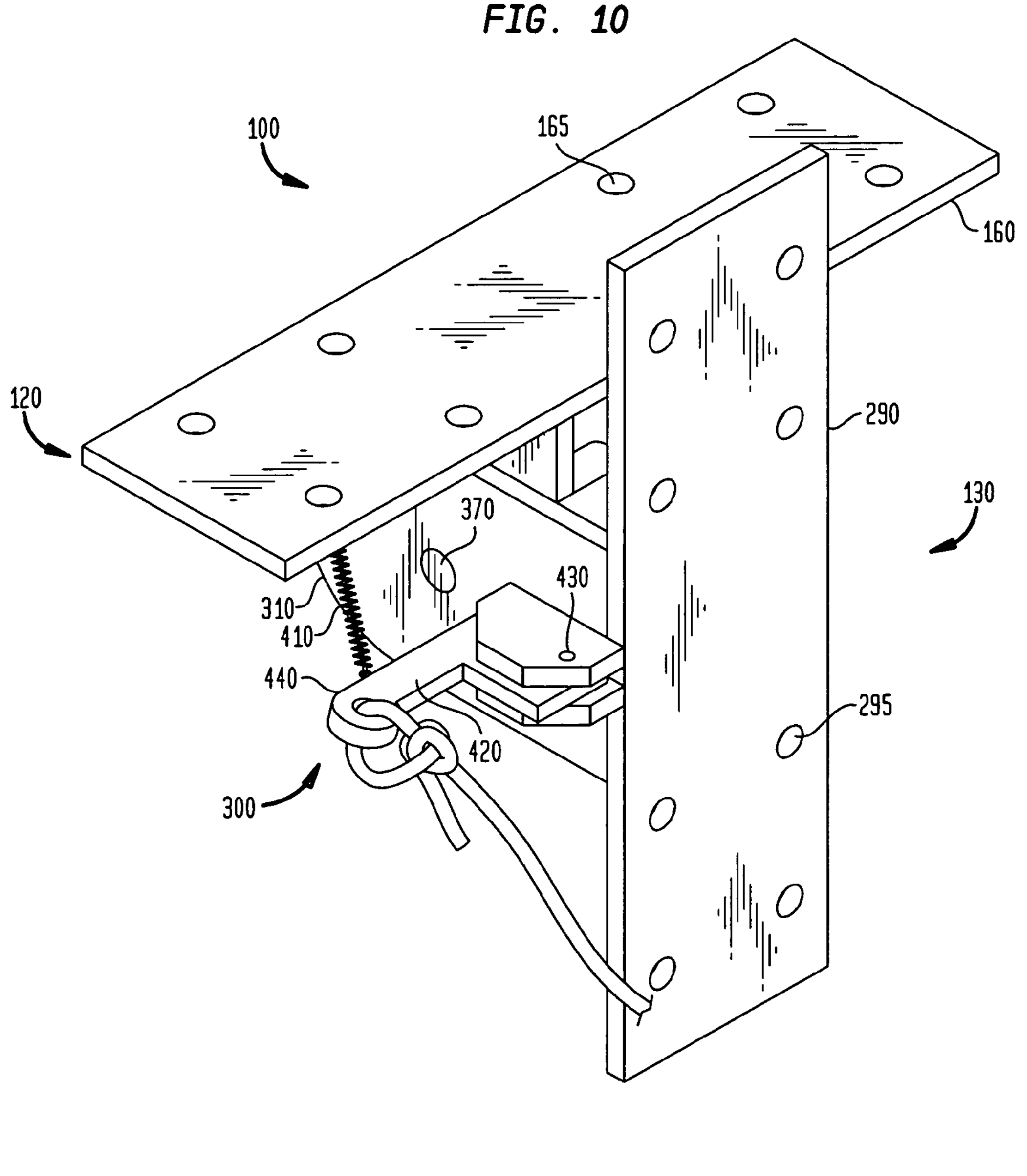
FIG. 10 is a perspective view of the second preferred embodiment of the present invention in the locked bent position.
Figure 11:
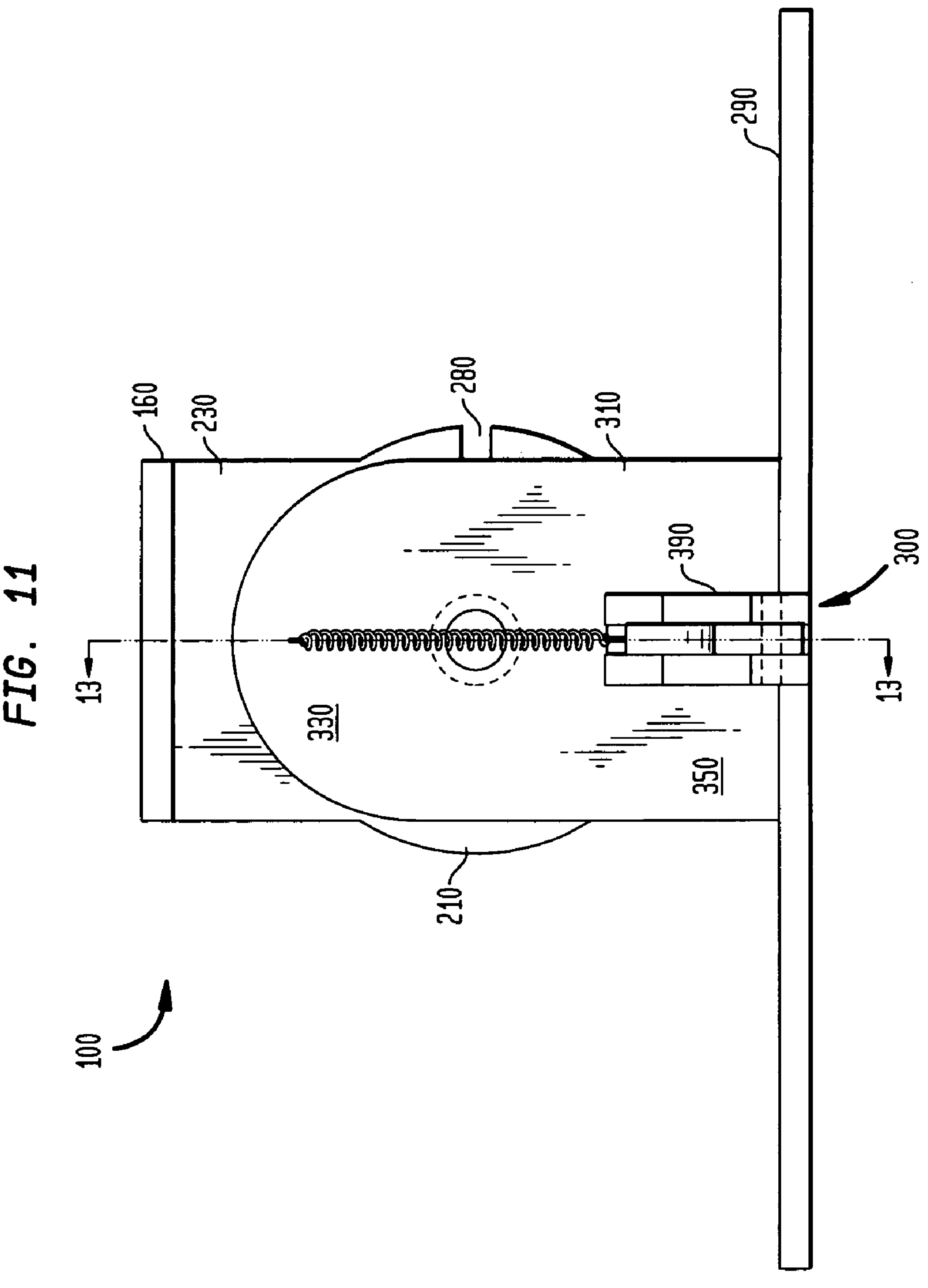
FIG. 11 is a left profile view of the second preferred embodiment of the present invention in the locked extended position.
Figure 12:
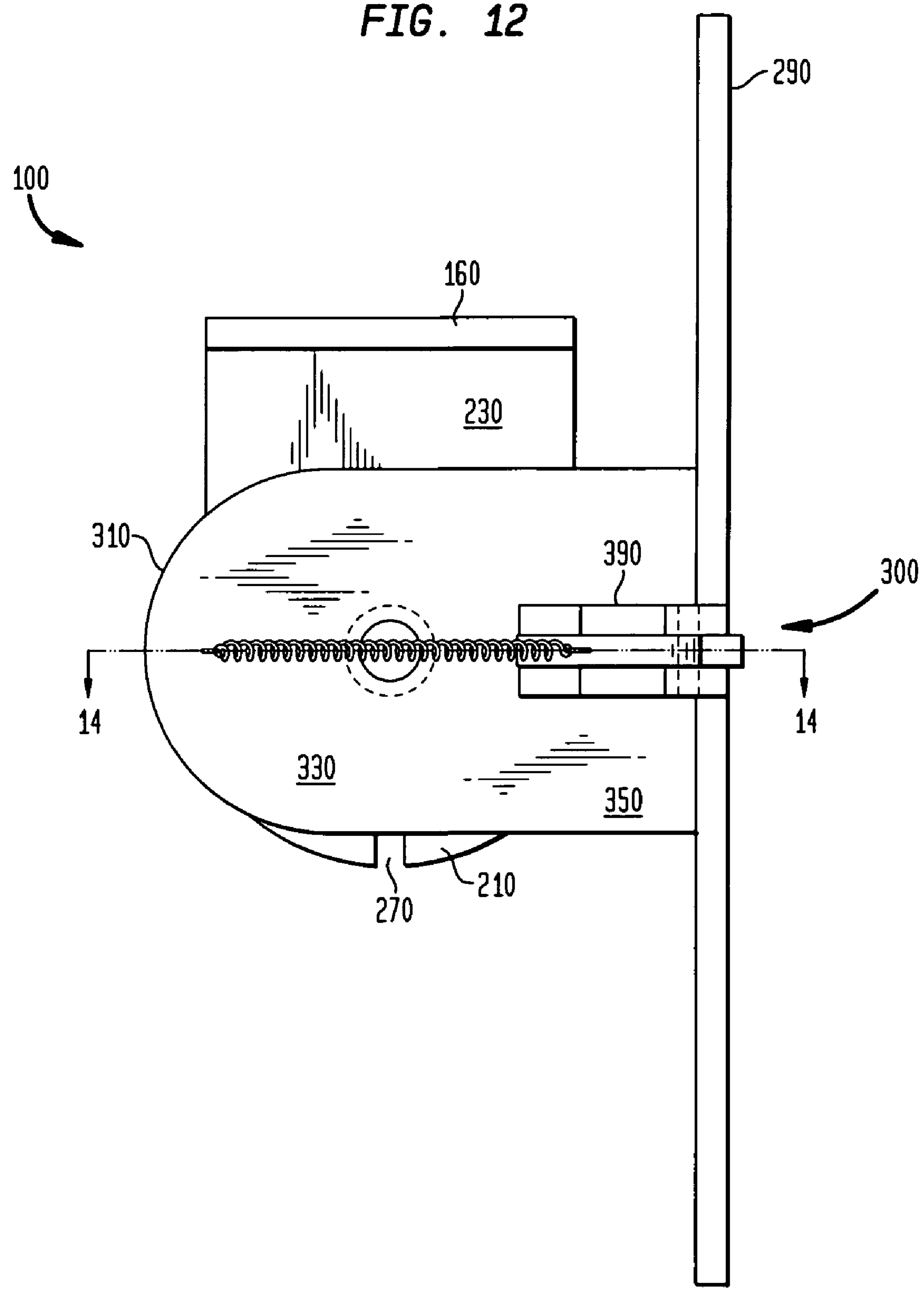
FIG. 12 is a left profile view of the second preferred embodiment of the present invention in the locked bent position.
Figure 13:
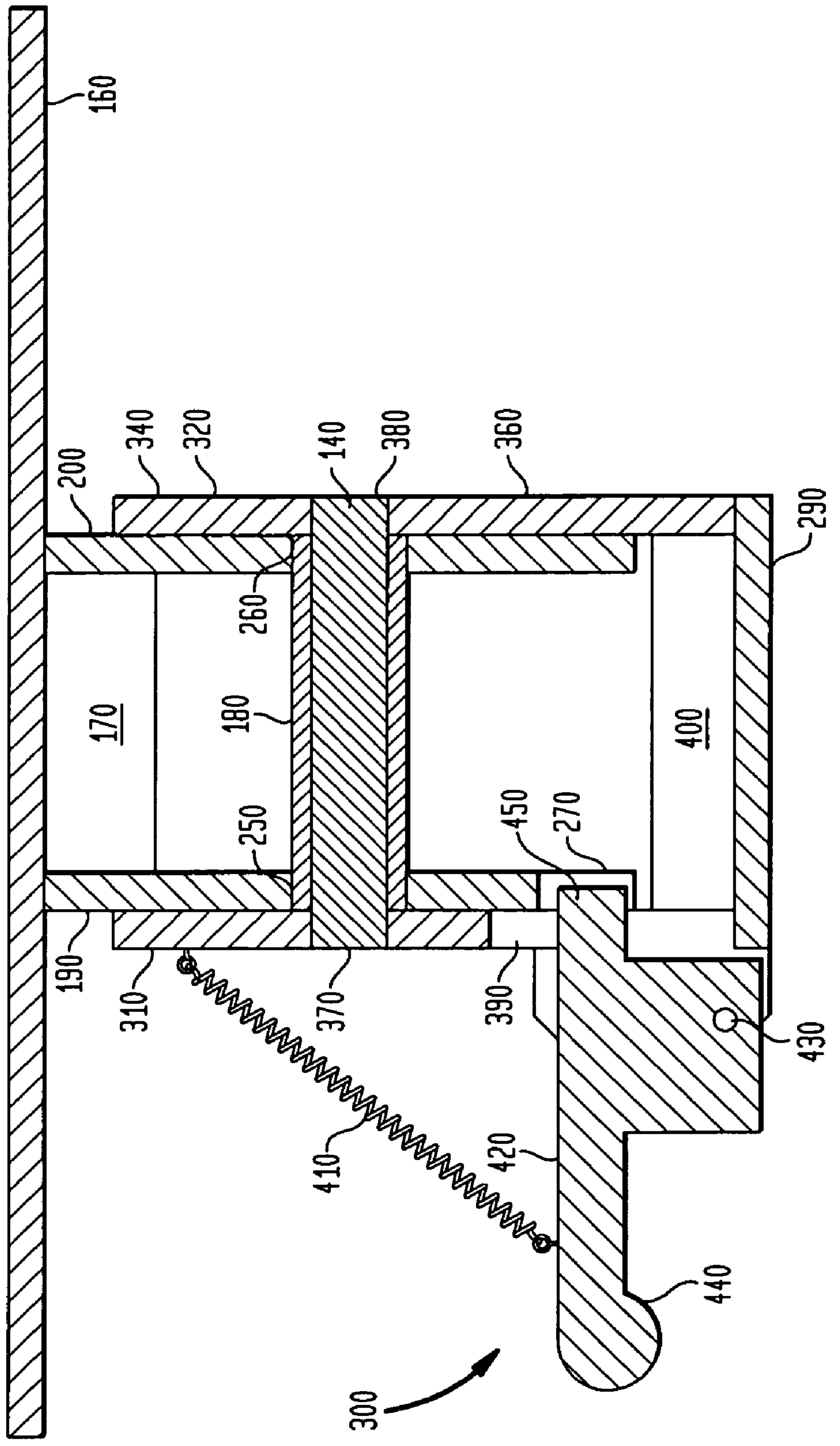
FIG. 13 is a cross-section view, along line 13 in FIG. 11, of the second preferred embodiment of the present invention in the locked extended position.
Figure 14:
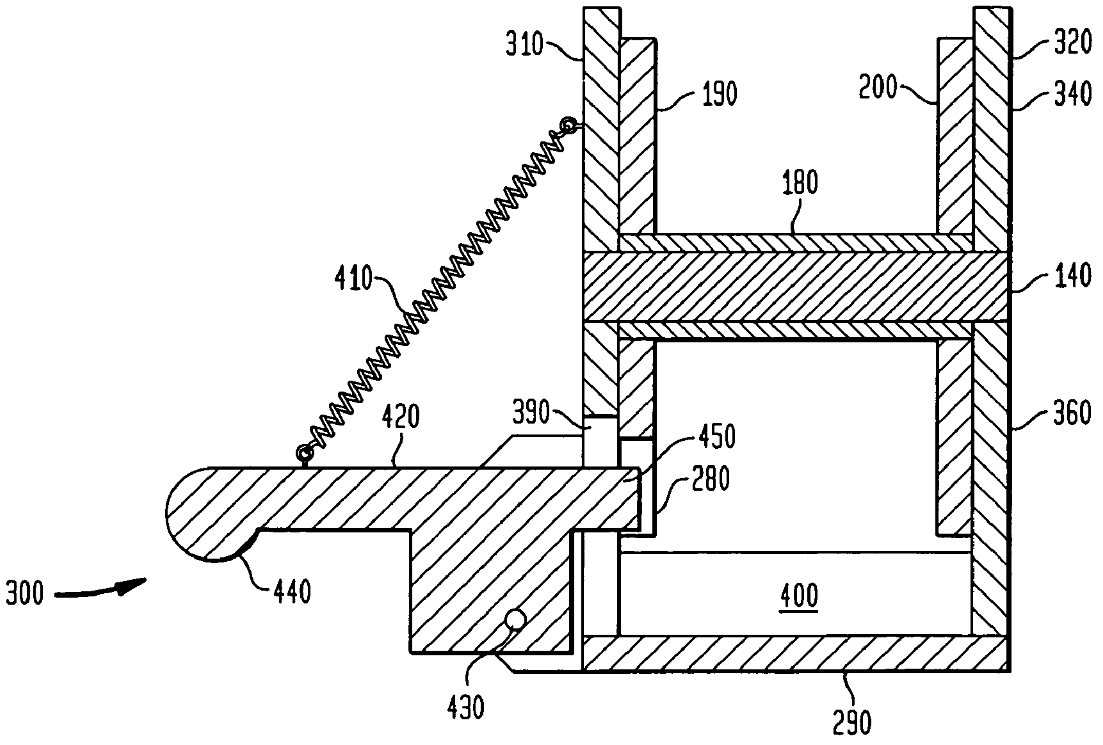
FIG. 14 is a cross-section view, along line 14 in FIG. 12, of the second preferred embodiment of the present invention in the locked bent position.

As shown in FIGS. 9-14, one or both of the two rotary panels 210 and 220 has two key slots: a first key slot 270 and a second key slot 280. The first key slot 270 is vertically aligned downward when the device 100 is in the extended position (as shown in FIGS. 9, 11 and 13) and is used for locking the device 100 in the extended position, as will be subsequently explained. The second key slot 280 is horizontally aligned forward when the device 100 is in the extended position and is vertically aligned downward when the device 100 is in the bent position (as shown in FIGS. 10, 12 and 14). The second key slot 280 is used for locking the device 100 in the bent position, as will be subsequently explained.

Preferably, as shown in FIGS. 9 and 13, the support of the attachment plate 160 is reinforced by two upper lateral supports 170 that extend between the support panels 230 and 240 front and back and connect to the bottom of the attachment plate 160. The upper lateral supports are preferably made of precast steel.

As depicted in FIG. 10, the lower member 130 comprises a base plate 290, a locking mechanism 300, and two lower cams—a left lower cam 310 and a right lower cam 320. The base plate 290 is aligned perpendicular to the attachment plate 160 and is preferably precast steel. The base plate has multiple lower threaded bolt holes 295, by which it is bolted to the pneumatic vise 110 that holds the steel sheet pile 105. The two lower cams 310 and 320 are connected to the top of the base plate 290 and are also preferably fabricated of precast steel. Each of the lower cams 310 and 320 integrally consists of a swivel panel 330 and 340 and a bracket panel 350 and 360. Consequently, there is a left swivel panel 330, a right swivel panel 340, a left bracket panel 350, and a right bracket panel 360. The left swivel panel 330 and the right swivel panel

340 are rotatably connected to the spindle sleeve 180 and to the rotary panels 210 and 220 of the two upper cams 190 and 200 by the spindle 140, which is a solid steel rod, preferably having an outer diameter of 6". The ends of the spindle 140 pass through a left spindle aperture 370 and a right spindle aperture 380, each of which preferably has an inner diameter of 6".

As shown in FIGS. 11-14, one or both of the two bracket panels 350 and 360 has a lock opening 390, through which the locking mechanism 300 communicates with the key slots 270 and 280 in locking the device 100 in the either the extended or bent position, as will be subsequently explained.

Preferably, as shown in FIG. 2, the support of the base plate 290 is reinforced by two lower lateral supports 400 that extend between the bracket panels 350 and 360 front and back and connect to the top of the base plate 290. The lower lateral supports are preferably made of precast steel.

As depicted in FIGS. 9, 10, 13 and 14, the locking mechanism 300 comprises a spring 410, a lever arm 420, and a pivot 430. The lever arm comprises a handle 440 and a key 450, with the pivot 430 being located between them. One end of the spring 410 is attached to the handle 440, while the other end is anchored on the adjoining swivel panel 330. When the first key slot 270 is aligned with the lock opening 390, the contraction of the spring 410 pulls the handle 440 upward, causing the lever arm 420 to pivot so that the key 450 moves downward to engage the first key slot 270. When the device is in the extended position, as depicted in FIGS. 9 and 13, the first key slot 270 aligns with the lock opening 390, and the key 450 extends through the lock opening 390 into the first key slot 270, where it is locked in place by the force of the spring 410.

As illustrated in FIGS. 10 and 14, when a steel sheet pile 105 on the ground is to be loaded into the pneumatic vise 110, the handle 440 is depressed, which expands the spring 410 and causes the lever arm 420 to pivot so that the key 450 moves upward and disengages from the first key slot 270. The lower member 130 is now free to rotate to a perpendicular orientation with respect to the upper member 120, and the device 100 is now in the bent position. In the bent position, the second key slot 280 aligns with the lock opening 390, and the key extends through the lock opening 390 into the second key slot 280, where it is locked in place by the force of the spring 410.

Once the sheet pile 105 is loaded and attached to the jaws of the pneumatic vise 110, the device 100 is hoisted upward by a vibratory hammer bolted to the attachment plate 160. As the device 100 is hoisted, the weight of the vise 110 and sheet pile 105 tend to pull the lower member 130 down into a vertical orientation with respect to the upper member 120. By depressing the handle 440 of the lever arm 420 again, the key disengages from the second key slot 280, so that the lower member 130 is free to rotate back into the extended position in which the lock opening 390 aligns with the first key slot 270. The key 450 will then move downward into the first key slot 270 as it's urged to do by the contracting force of the spring 410. With the key 450 engaged in the first key slot 270, the device 100 is locked in the extended position and is ready to be driven by the vibratory hammer 150.

Although the preferred embodiment of the present invention has been disclosed for illustrative purposes, those skilled in the art will appreciate that many additions, modifications and substitutions are possible, without departing from the scope and spirit of the present invention.

What is claimed is:

1. A device for lifting a sheet pile from a horizontal position on a surface to a vertical position suspended above the surface, the device comprising:

(a) an upper member, comprising an attachment beam, a rectangular top plate having an upper surface and a bottom surface, a tubular spindle sleeve having two ends, and two rotary upper cams, wherein the attachment beam is attachable to both a lifting means and a pile-driving means, and wherein the attachment beam further comprises one or more rectangular beam panels, which are orthogonally vertically welded to the upper surface of the top plate, and wherein the upper cams are orthogonally vertically welded to the bottom surface of the top plate, and wherein each of the upper cams has an axial circular sleeve aperture which rigidly encloses one of the ends of the spindle sleeve, and wherein one or both of the upper cams has in its outer perimeter one or more key slots;

(b) a lower member, comprising a rectangular base plate having a top surface and a bottom surface, one or more locking mechanisms, two rotary lower cams, and a mandrel, wherein the mandrel further comprises a concave-contoured panel which has a shape and dimensions that conform to the sheet pile, and which is attachable to the sheet pile, and which is orthogonally vertically welded to the bottom surface of the base plate, and wherein the lower cams are orthogonally vertically welded to the top surface of the base plate, and wherein each of the lower cams has an axial circular spindle aperture, and wherein one or both of the lower cams has a base with a lock opening, and wherein the locking mechanism further comprises a spring-actuated lever arm which is pivotally attached to the base plate and which has a handle at its proximal end and a key at its distal end, such that the spring has a tension which urges the lever arm into a parallel orientation with respect to the base plate, in which orientation the key extends through and engages both the lock opening and the key slot and thereby constrains and locks the lower member in a 180° vertically extended alignment with respect to the upper member; and (c) a spindle, comprising a cylindrical shaft, having a medial area which is rotatably enclosed within the spindle shaft and two ends which are rigidly enclosed within the spindle apertures, such that, when the handle of the locking mechanism is depressed, thereby disengaging the key from the key slot, the upper member is free to rotate with respect to the lower member, and vice-versa, such that the upper member and the lower member can be rotated into a 90° mutually perpendicular alignment, such that, when the device is in the perpendicular alignment, a sheet pile can be horizontally attached to the mandrel, the attachment beam can be attached to the lifting means, and the device with the sheet pile thus attached can be lifted into a vertical position, in which the device rotates to and locks into the vertically extended alignment, such that the attachment beam can be disengaged from the lifting means and attached to the pile-driving means.

2. The device according to claim 1, wherein there is a first key slot and a second key slot in one or both of the upper cams, and wherein the second key slot has an angular separation of 90° from the first key slot, such that, when the device is in the perpendicular alignment, the key extends through and engages both the locking opening and the second key slot and thereby constrains and locks the lower member in the 90° perpendicular alignment with respect to the upper member.

* * * * *